M. L. ORUM.

Gas-Bracket Match-Safes.

No. 6,079. Reissued Oct. 6, 1874.

Witnesses.

D. L. Collier

H. S. Harding.

Inventor.

Morris L. Orum, by J. Snowden Bell atty.

UNITED STATES PATENT OFFICE.

MORRIS L. ORUM, OF PHILADELPHIA, PENNSYLVANIA, ASSIGNOR OF ONE-HALF INTEREST TO CHARLES H. MELLOR.

IMPROVEMENT IN GAS-BRACKET MATCH-SAFES.

Specification forming part of Letters Patent No. 144,283, dated November 4, 1873; reissue No. 6,079, dated October 6, 1874; application filed August 14, 1874.

*To all whom it may concern:*

Be it known that I, MORRIS L. ORUM, of the city and county of Philadelphia, in the State of Pennsylvania, have invented a new and useful Improvement in Gas-Bracket Match-Safes, of which the following is a specification:

My invention relates to an improvement in constructing and arranging match-safes, and consists in a combined gas-bracket back and match-safe, as hereinafter described.

Figure 1:
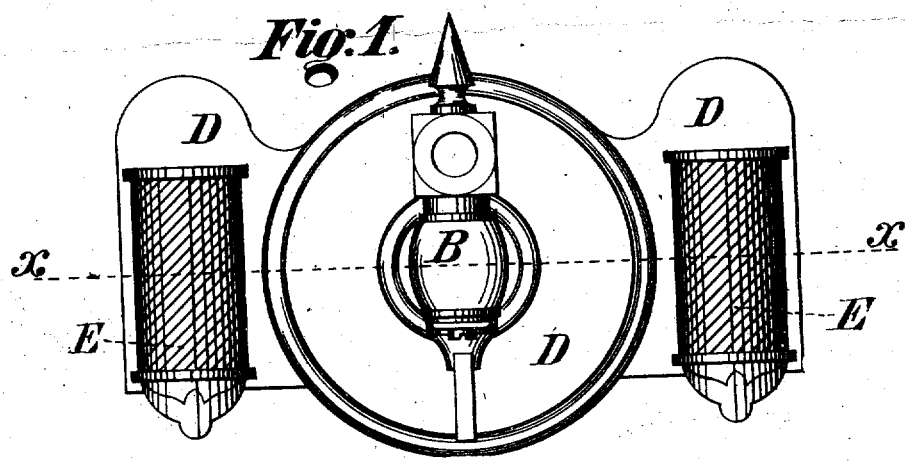
Figure 2:
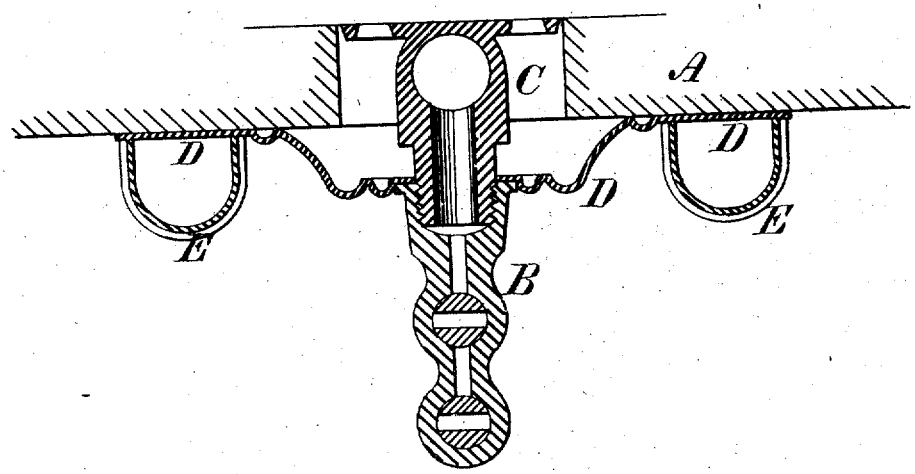

In the accompanying drawing, Figure 1 is a front elevation of a gas-bracket match-safe embodying my improvement; and Fig. 2, a horizontal section of the same at the line *x x* of Fig. 1.

The gas service-pipe C projects from the wall A, passing through an opening in the bracket-back D. The bracket-pipe B, which carries the gas-burner, is screwed upon the end of the service-pipe C, and retains the bracket-back D in position. The bracket-back is extended laterally in one or both directions, and has a match-safe or safes, E, attached to it.

The bracket-back may be attached to the wall by means of screws or nails or in any other suitable manner, should the friction caused by the bracket-pipe in connecting it with the service-pipe be insufficient to keep the bracket-back in position. The safes may be in any convenient form, and of any style of workmanship, so that the bracket will present a neat and artistic appearance.

I prefer a safe or box on each side of the bracket-back of uniform size and design, as one may be used for matches and the other for the stubs, but I do not confine myself to any particular number.

I claim as my invention—

A combined match-safe and gas-bracket back, as a new article of manufacture.

MORRIS L. ORUM.

Witnesses:

J. SNOWDEN BELL.

THOS. T. LEWIS.